United States Patent
King et al.

(10) Patent No.: US 10,779,515 B1
(45) Date of Patent: Sep. 22, 2020

(54) ANCHOR DEVICE

(71) Applicants: David King, Springdale, AR (US); Ray Stewart, Springdale, AR (US)

(72) Inventors: David King, Springdale, AR (US); Ray Stewart, Springdale, AR (US)

(*) Notice: Subject to any disclaimer, the term of this patent is extended or adjusted under 35 U.S.C. 154(b) by 312 days.

(21) Appl. No.: 16/007,159

(22) Filed: Jun. 13, 2018

Related U.S. Application Data

(60) Provisional application No. 62/519,381, filed on Jun. 14, 2017.

(51) Int. Cl.
*A01K 61/00* (2017.01)
*A01K 61/78* (2017.01)
*F16B 9/00* (2006.01)
*A01K 61/10* (2017.01)

(52) U.S. Cl.
CPC .............. *A01K 61/78* (2017.01); *A01K 61/10* (2017.01); *F16B 9/058* (2018.08)

(58) Field of Classification Search
CPC ........ A01K 61/78; A01K 61/10; A01K 61/70; A01K 61/73; A01K 61/77; Y02A 40/83; Y02A 40/832; Y02A 40/834; Y02A 40/836; Y02A 40/838; Y02A 40/84; E02B 3/046; E02B 3/24; B63B 21/29
USPC ................. 119/221, 207, 208, 209, 222, 238
See application file for complete search history.

(56) References Cited

U.S. PATENT DOCUMENTS

| | | | | |
|---|---|---|---|---|
| 3,741,159 A | * | 6/1973 | Halaunbrenner | A01K 61/54 119/240 |
| 4,092,944 A | * | 6/1978 | Van der Wal | B63B 21/29 114/297 |
| 4,471,552 A | * | 9/1984 | McIntosh | A01K 79/02 43/17.1 |
| 4,727,672 A | | 3/1988 | Hill | |
| 4,744,331 A | * | 5/1988 | Whiffin | A01K 29/00 119/223 |
| 4,916,845 A | | 4/1990 | Aydelette | |
| 5,005,309 A | | 4/1991 | Hall | |
| 5,272,829 A | | 12/1993 | Roberts | |
| 5,315,779 A | | 5/1994 | Fussell | |
| 5,700,108 A | * | 12/1997 | Bishop | E02B 3/046 405/26 |
| 6,523,497 B2 | | 2/2003 | Smith | |
| 6,978,735 B1 | | 12/2005 | Yeager | |
| 7,828,493 B1 | * | 11/2010 | Brignac | A01K 61/70 405/24 |
| 8,869,746 B2 | * | 10/2014 | Hardison | B63B 21/29 119/221 |
| 2003/0136349 A1 | * | 7/2003 | Hall | A01K 61/70 119/221 |

* cited by examiner

*Primary Examiner* — Trinh T Nguyen
(74) *Attorney, Agent, or Firm* — Wright Lindsey Jennings, LLP; Meredith Lowry

(57) ABSTRACT

The present invention is an anchor for an artificial structure for attracting fish within a body of water. The structure is comprised of a base and has a central attachment post, a central column configured to secure to the attachment post, and a protective plate.

3 Claims, 5 Drawing Sheets

ANCHOR DEVICE

CROSS-REFERENCE TO RELATED APPLICATIONS

This application claims priority to and is a continuation-in-part of U.S. Provisional Patent Application Ser. No. 62/519,381 filed on Jun. 14, 2017, the disclosure of which is hereby incorporated by reference herein in its entirety.

STATEMENT REGARDING FEDERALLY SPONSORED RESEARCH OR DEVELOPMENT

Not Applicable.

REFERENCE TO A MICROFICHE APPENDIX

Not Applicable.

BACKGROUND OF THE INVENTION

1. Field of the Invention

The present invention pertains to an anchor for artificial structures adapted for submersion in bodies of water. The artificial structure is configured to be attractive to fish, and thus to create an artificial habitat around which fish can usually be found. The anchor for this artificial structure is configured to allow secure attachment to the artificial structure and provide weight for the structure to keep it secured within the water.

2. Description of the Known Art

Fish that live in natural environments such as lakes, streams, oceans, ponds and rivers, can usually be found around the protective cover of rocks, coral, plant life and the like. However, many of these habitats have been destroyed by natural phenomena such as hurricanes, floods, and the like. Additionally man made problems such as pollutants, dams and other developmental issues have claimed their fair share of these habitats as well. This loss of habitats has led to entire species being lost from certain bodies of waters, thus further affecting other organisms in the food chain. Even fishermen, who at one time would frequent certain fishing spots, would stop their visits, thus affecting local business cycles as well.

Accordingly, there exists a need for a means by which fish habitats can be replaced or created in a manner which is quick, easy and effective. The development of the artificial structure for attracting fish fulfills this need. These artificial structures require anchoring devices to maintain the position of the structure in the body of water, as these bodies of water often have currents. Thus the development of the anchor device satisfies this need.

Details of artificial structures for attracting fish are contained in U.S. Pat. No. 4,727,672 issued to Hill, et al. on Mar. 1, 1988; U.S. Pat. No. 4,916,845 issued to Aydelette, Sr. on Apr. 17, 1990; U.S. Pat. No. 5,005,309 issued to Hall on Apr. 9, 1991; U.S. Pat. No. 5,272,829 issued to Roberts, et al. on Dec. 28, 1993; U.S. Pat. No. 5,315,779 issued to Fussell on May 31, 1994; U.S. Pat. No. 6,523,497 issued to Smith on Feb. 25, 2003; U.S. Pat. No. 6,978,735 issued to Yeager on Dec. 27, 2005. Each of these patents is hereby expressly incorporated by reference in their entirety.

U.S. Pat. No. 4,727,672 issued to Hill, et al. on Mar. 1, 1988 entitled Artificial Structure for Attracting Fish teaches an artificial structure for attracting fish that includes a ballast and anchoring subassembly having an elongated trunk detachably and pivotally connected thereto and extending in a generally vertical direction therefrom. A plurality of elongated leaf fronds are each centrally engaged with the trunk at longitudinally spaced intervals along the trunk.

U.S. Pat. No. 4,916,845 issued to Aydelette, Sr. on Apr. 17, 1990 entitled Device to Attract Fish discloses a device for attracting fish in fresh water lakes and ponds that includes one or more disk which are tandemly arranged and are anchored by a tubular transparent anchor which contains bait fish. The disks have a concave configuration and are formed from a floatable plastic. A serrated edge on at least the bottom disk provides a niche for a fishing line to maintain the fishing line bait near the fish which congregate under the disks.

U.S. Pat. No. 5,005,309 issued to Hall on Apr. 9, 1991 entitled Instrumented Drift Fish Aggregating Device and Method discloses an instrumented drift fish aggregating device to attract game fish for harvest. A highly positive flotation buoy with instrumentation including visual and radio acquisition devices floats on the water. Suspended from the buoy is a plurality of suspension lines connected to a ballast weight, which combine for stability of the buoy. A multiplicity of fish attraction streamers are connected to the suspension lines. The device can provide information to a remote location, such as a fishing vessel, by radio means as to its location, water temperature and quantity of fish in the vicinity of the buoy.

U.S. Pat. No. 5,272,829 issued to Roberts, et al. on Dec. 28, 1993 entitled Fish Attracting Bassin Stump and Method of Use discloses a fish attracting device which simulates a tree stump to provide a habitat for fish to congregate. The device includes an outer textured wall that resembles the bark on a tree trunk and an inner chamber secured to the outer textured wall. A structure for deploying the device within a body of water is secured to the inner chamber.

U.S. Pat. No. 5,315,779 issued to Fussell on May 31, 1994 entitled Fish Habitat discloses an artificial habitat assembly for fish or other aquatic life that includes a series of vertically spaced plates or discs having a specified gravity less than 1.0, which are held adjacent the bottom of a body of water by an anchor and a flexible stress member to which the plates are attached in vertically spaced relationship. The plates provide areas of shade or darkness which are attractive to fish seeking shelter.

U.S. Pat. No. 6,523,497 issued to Smith on Feb. 25, 2003 entitled Reticulated Fish Aggregation Apparatus discloses a submersible artificial fish bed formed of hollow members that are self flooded in order to be placed.

U.S. Pat. No. 6,978,735 issued to Yeager on Dec. 27, 2005 entitled Artificial Fish Habitat discloses an artificial fish habitat that comprises an open framework including a plurality of layers. The layers each include an open portion and are generally aligned so that the open portions cooperate to define a passageway through the framework for fish to reside therein. Each layer includes a periphery section which is formed from a material presenting a minimum cross section sized and configured to be greater than the gap spacing of a conventional fish hook such that the hook may not snag on the framework. A method of utilizing the partially submerged habitat comprises descending a hook through the passageway to contact a layer and withdrawing the hook without snagging.

The use of the present invention provides fish a habitat in areas where none exist. Fisherman in the past have cut natural tree limbs or shrubs and placed them at desired locations in lakes and ponds to serve as gathering points and shelters for fish. All such past devices have been employed with varying degrees of success depending on the type of fishing conducted, and the particular conditions encountered. Certain serious drawbacks have resulted for example, in using artificial or natural tree limbs as fishing lines often become enwrapped with the limbs and have to be cut free. Other specific devices which have been used are difficult to retrieve or move as may be desired from time to time or from location to location. Also, artificial devices can be expensive, easily damaged and are therefore little used. Other artificial devices have provided an area that attracts fish momentarily, but does not encourage the fish to stay within the area for a length of time since the fish must remain active.

The prior art patents are very limited in their teaching and utilization, and an improved anchor for an artificial structure for attracting fish is needed to overcome these limitations.

SUMMARY OF THE INVENTION

The present invention is an anchor for an artificial structure for attracting fish within a body of water. The structure is comprised of a base has a central attachment post, a central column configured to secure to the attachment post, and a protective plate. For deployment of the anchor, the central column is fitted or secured by a fastener to the post and a standard concrete block having an aperture is placed around the central column, leaving a length of the central column extending from the top of the concrete block. The top plate is the placed above the concrete block and the fish habitat having a central mast is fitted and secured around the exposed length of the central column.

The structure is composed of material adapted to be lowered to the bottom of a lake, stream, pond or other similar body of water. The structure provides a mechanism for connecting the artificial habitat to the concrete block. Such artificial habitats can also be used to the advantage of fishermen who are looking for the areas where fish tend to congregate.

An objective of the present invention is to provide an anchoring device for a fish habitat, which will present fish in ponds and lakes with an attractive gathering site and also will be convenient for the fishermen to enjoy.

It is also an objective of the present invention to provide an anchoring device which can be selectively and quickly deployed for a fish habitat.

These and other objects and advantages of the present invention, along with features of novelty appurtenant thereto, will appear or become apparent by reviewing the following detailed description of the invention.

BRIEF DESCRIPTION OF THE SEVERAL VIEWS OF THE DRAWINGS

In the following drawings, which form a part of the specification and which are to be construed in conjunction therewith, and in which like reference numerals have been employed throughout wherever possible to indicate like parts in the various views.

DETAILED DESCRIPTION OF THE INVENTION

Reference throughout this specification to "one embodiment", "an embodiment", "one example" or "an example" means that a particular feature, structure or characteristic described in connection with the embodiment or example is included in at least one embodiment of the present invention. Thus, appearances of the phrases "in one embodiment", "in an embodiment", "one example" or "an example" in various places throughout this specification are not necessarily all referring to the same embodiment or example. Furthermore, the particular features, structures or characteristics may be combined in any suitable combinations and/or sub-combinations in one or more embodiments or examples. In addition, it is appreciated that the figures provided herewith are for explanation purposes to persons ordinarily skilled in the art and that the drawings are not necessarily drawn to scale.

It will be understood that, although the terms first, second, etc. may be used herein to describe various elements, these elements should not be limited by these terms. These terms are only used to distinguish one element, from another element. For instance, a first element discussed below could be termed a second element without departing from the teachings of the present invention. Similarly, the second element could also be termed the first element.

The term "and/or" includes any and all combinations of one or more of the associated listed items. The terminology used herein is for the purpose of describing particular embodiments only and is not intended to be limiting. As used herein, the singular forms "a," "an" and "the" are intended to include the plural forms as well, unless the context clearly indicates otherwise.

Concrete masonry units are also called concrete bricks, concrete blocks, cement blocks, besser blocks, breeze blocks, and cinder blocks. Here, the term "concrete block" will be employed.

The present invention is an anchor device 10 for an artificial structure 100 for attracting fish in a body of water.

In general, the anchor device 10 is for a structure 100 comprised of central circular mast 110 having an annular recess within the center of the mast 110 configured to receive an elongated circular structure having a smaller circumference and having a series of flexible shafts (not shown) inserted through the central mast 110. The structure 100 forms an artificial habitat or shield for any fish who may be seeking refuge from predators or seeking other fish or food to eat.

Figure 1A:
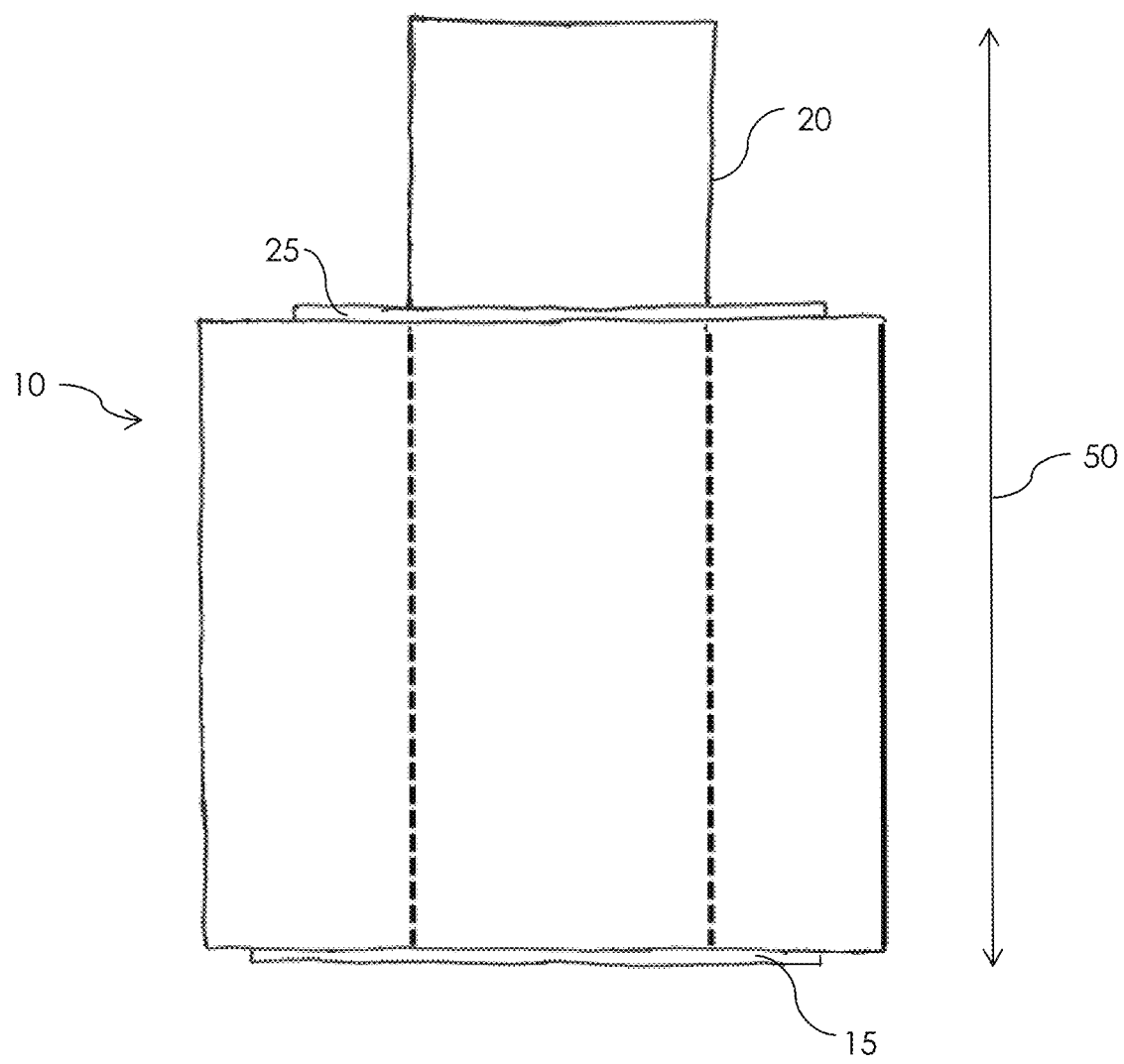
FIG. 1a is a cross-sectional view of the anchor for the artificial structure for attracting fish.
Figure 1B:
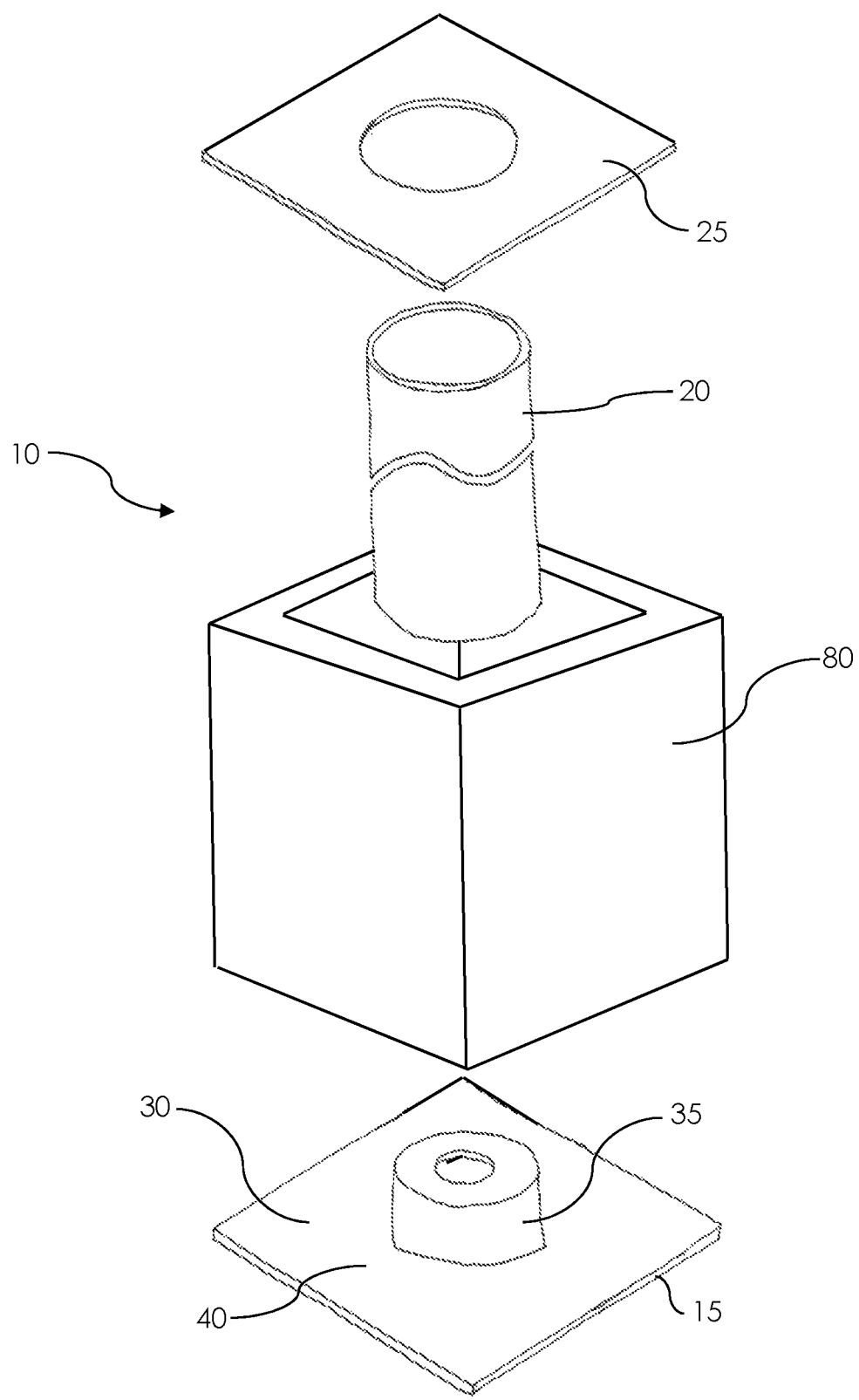
FIG. 1b is an exploded view of the same.

The anchor device is comprised of a base 15, a central column 20, and a top plate 25. As shown in FIG. 1a-1b, for deployment of the anchor 10, the central column 20 has an exterior circumference and is configured to be fitted or secured to the base 15 and a standard concrete block or other weight 80 having an aperture is placed around the central column 20, leaving a length of the central column 20 extending from the top of the concrete block 80. The top plate 25 is a substantially planar piece having a central aperture configured to receive the central column 20 above the concrete block 80 and the fish habitat 100 having a central mast is fitted and secured around the exposed length of the central column 20.

Figure 2:
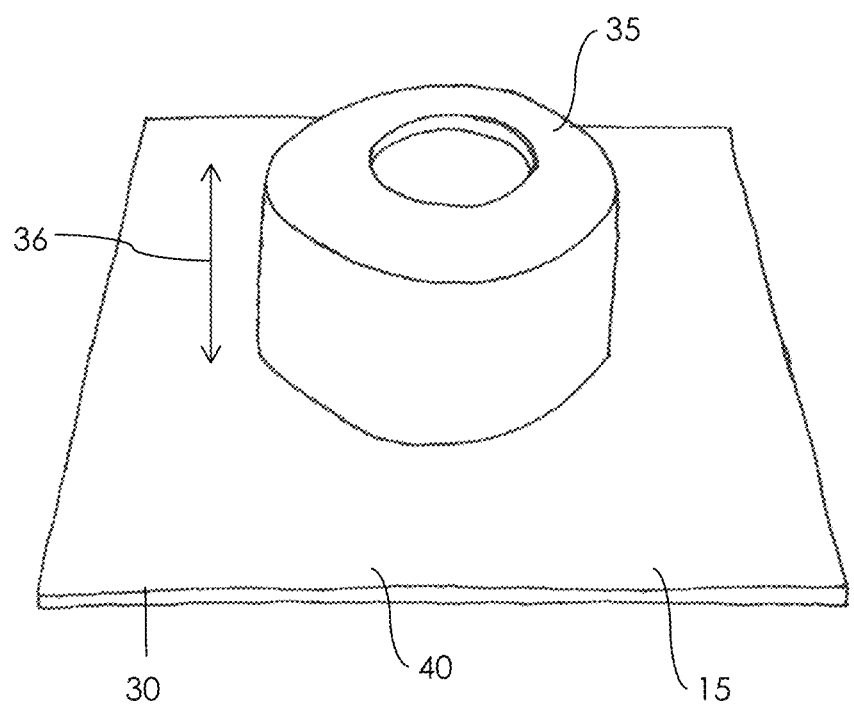
FIG. 2 is a side elevational view of the base for the anchor.

As shown in FIG. 2, the base 15 is a substantially planar platform 30 having a central post 35 that extends from the planar face 40 of the platform 30. The platform 30 has a thickness and is comprised of a plastic material, but other suitable materials may be used. The central post 35 is arcuate and has a circumference configured to fit within the interior of the central column 20. The central post 35 extends a distance 36 between 1½ inches to 3 inches above the planar face 40.

The central column 20 is a circular column having a first open end 45 and extending a length 50 to a second open end 55. The first open end 45 has an interior circumference configured to secure frictionally to the central post 35 of the base 15 and the second open end is configured to secure to the central mast of the structure 100. The diameter of the central column 20 is approximately 4 inches and suitable for fitting within the interior aperture of a standard concrete block or other blocks having a hollow space. The concrete block fits around the central column 20 around the central portion of the central column 20 between the first and second end.

Figure 3:
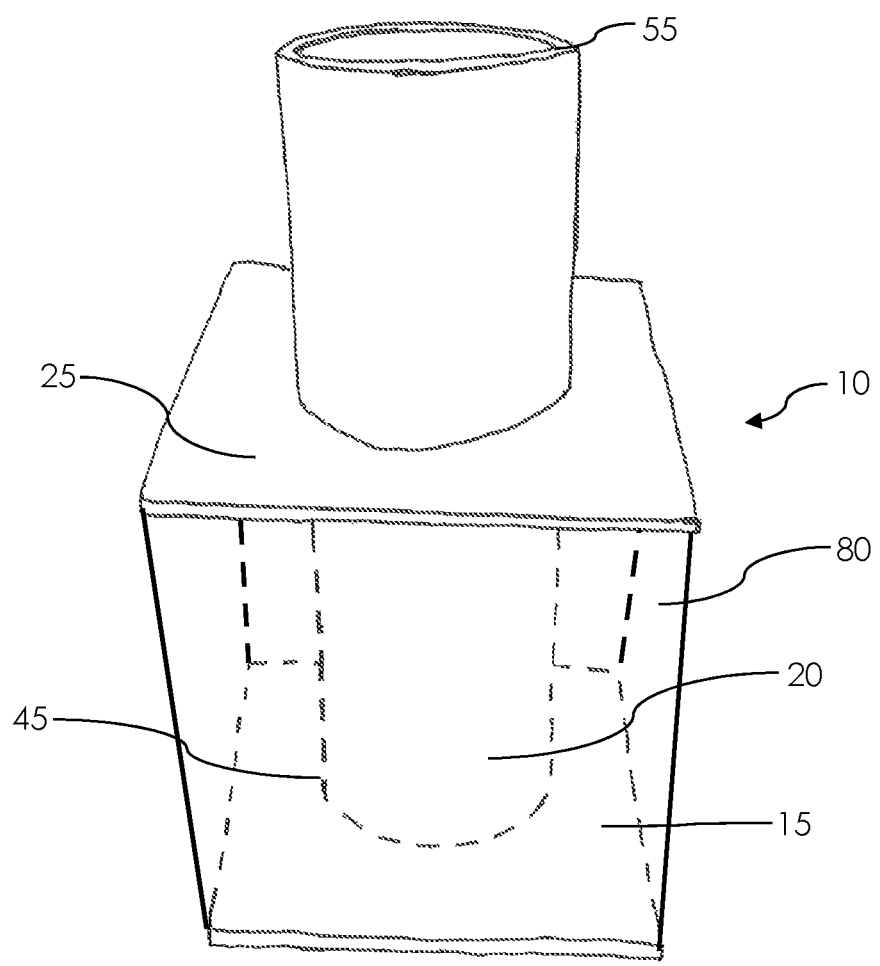
FIG. 3 is a side elevational view of the anchor with the concrete block removed.
Figure 4:
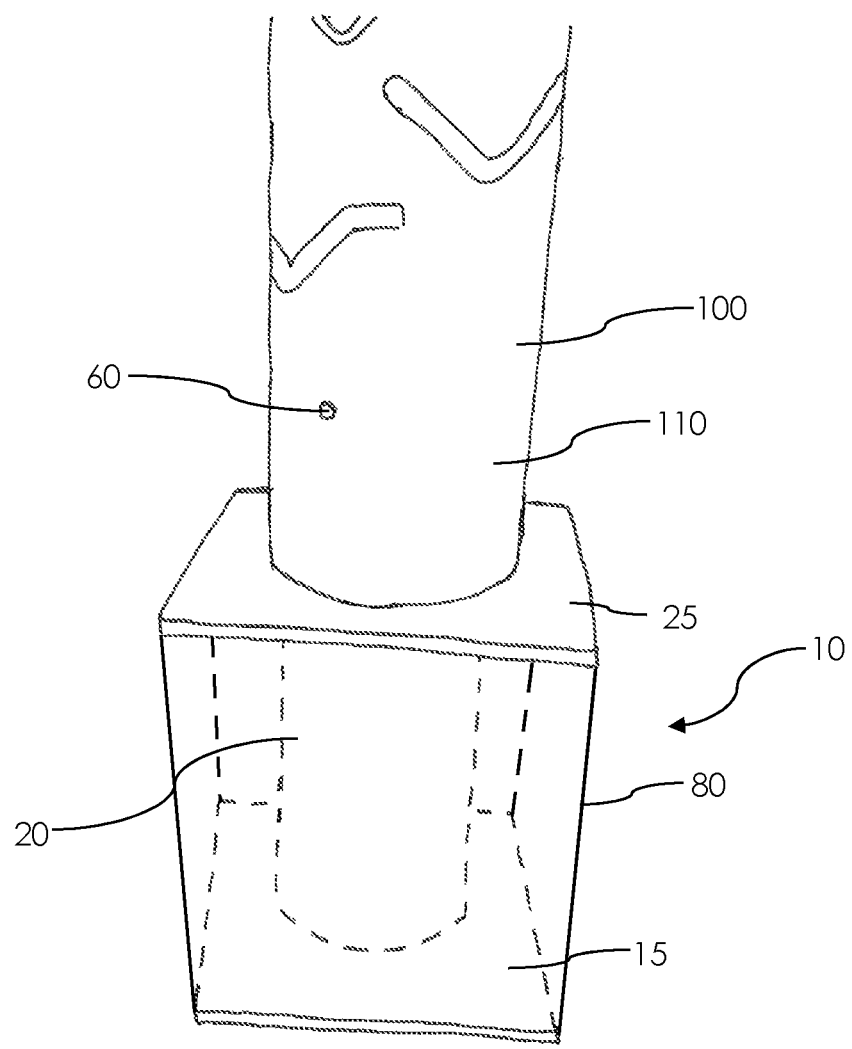
FIG. 4 is a side elevational view of the anchor with the concrete block removed and the habitat mast secured.

Once the concrete block is in place around the central column 20, the top shield 25 is fitted around the second open end of the column 20 to rest on the top of the block. As shown in FIG. 3 and FIG. 1a, a length of the central column 20 extends above the shield 25 to allow for connection of the habitat, as shown in FIG. 4. In this manner, the habitat 100 is shielded from the rough concrete edge of the block. Once the habitat is fitted around the exposed portion of the central column 20, the habitat can be secured to the central column by a fastening bolt 60.

From the foregoing, it will be seen that this invention is well adapted to obtain all the ends and objects herein set forth, together with other advantages which are inherent to the structure. It will also be understood that certain features and subcombinations are of utility and may be employed without reference to other features and subcombinations. This is contemplated by and is within the scope of the claims. Many possible embodiments may be made of the invention without departing from the scope thereof. Therefore, it is to be understood that all matter herein set forth or shown in the accompanying drawings is to be interpreted as illustrative and not in a limiting sense.

What is claimed is:

1. An anchor device for an artificial fish habitat having a central mast having an interior configured to receive an elongated structure, said anchor device comprising:
   a base comprising a substantially planar platform having a substantially planar face and an arcuate central post extending a length from said planar face;
   an elongated arcuate column having a first open end and extending to a second open end along a length, said elongated arcuate column to secure to said arcuate central post of said base at said first open end of said elongated arcuate column;
   said elongated arcuate column having an exterior circumference, said elongated arcuate column sized to a concrete block having an aperture around said exterior circumference and extending a length above the height of the concrete block to provide an attachment length for securing within the interior of the central mast of the fish habitat;
   a substantially planar top plate having an aperture to receive said elongated arcuate column around said second open end of said elongated arcuate column above the concrete block; and
   a fastening bolt to secure the central mast of the fish habitat to said elongated arcuate column.

2. An anchor device for an artificial fish habitat having a central mast having an interior configured to receive an elongated structure, said anchor device comprising:
   a base comprising a substantially planar platform having a planar face and an arcuate central post extending a length from said planar face;
   an elongated central column having a first open end and extending to a second open end along a length, said elongated central column to secure to said arcuate central post of said base at said first open end of said elongated central column;
   said elongated central column having an exterior circumference, said elongated central column sized to receive a concrete block having an aperture around said exterior circumference and extending a length above the height of the concrete block to provide an attachment length for securing within the interior of the central mast of the fish habitat;
   a substantially planar top plate having an aperture to receive said elongated central column around said second open end of said elongated central column above the concrete block; and
   a fastening bolt to secure the central mast of the fish habitat to said elongated central column.

3. An anchor device for an artificial fish habitat having a central mast having an interior configured to receive an elongated structure, said anchor device comprising:
   a base comprising a substantially planar platform having a substantially planar face and an arcuate central post having a first exterior circumference and extending a length from said planar face;
   an elongated arcuate column having a first open end and extending to a second open end along a length, said elongated arcuate column having a second interior circumference to receive said arcuate central post of said base at said first open end of said elongated arcuate column;
   said elongated arcuate column having an exterior circumference, said elongated arcuate column sized to receive a weight having an aperture around said exterior circumference and extending a length above the height of the weight to provide an attachment length for securing within the interior of the central mast of the fish habitat;
   a substantially planar top plate having an aperture to receive said elongated arcuate column around said second open end of said elongated arcuate column above the weight; and
   a fastening bolt to secure the central mast of the fish habitat to said elongated arcuate column.

\* \* \* \* \*